United States Patent
Fantinel et al.

(10) Patent No.: US 9,738,778 B2
(45) Date of Patent: Aug. 22, 2017

(54) PROCESS FOR THE OBTAINMENT OF A POLYOLEFIN COMPOSITION

(71) Applicant: Basell Polyolefine GmbH, Wesseling (DE)

(72) Inventors: Fabiana Fantinel, Ferrara (IT); Bodo Richter, Ferrara (IT); Shahram Mihan, Bad Soden (DE); Massimo Covezzi, Kelkheim (DE); Claudio Cavalieri, Kelkheim (DE); Michele Grazzi, Ferrara (DE)

(73) Assignee: Basell Polyolefine GmbH, Wesseling (DE)

( * ) Notice: Subject to any disclaimer, the term of this patent is extended or adjusted under 35 U.S.C. 154(b) by 347 days.

(21) Appl. No.: 14/407,204

(22) PCT Filed: Jun. 19, 2013

(86) PCT No.: PCT/EP2013/062686
§ 371 (c)(1),
(2) Date: Dec. 11, 2014

(87) PCT Pub. No.: WO2013/189960
PCT Pub. Date: Dec. 27, 2013

(65) Prior Publication Data
US 2015/0166778 A1 Jun. 18, 2015

Related U.S. Application Data

(60) Provisional application No. 61/662,286, filed on Jun. 20, 2012.

(30) Foreign Application Priority Data

Jun. 19, 2012 (EP) ..................... 12172508

(51) Int. Cl.
| | | |
|---|---|---|
| *C08L 23/12* | (2006.01) | |
| *C08F 4/619* | (2006.01) | |
| *C08F 4/6592* | (2006.01) | |
| *C08F 4/70* | (2006.01) | |
| *C08L 23/08* | (2006.01) | |
| *C08L 23/10* | (2006.01) | |
| *C08L 23/16* | (2006.01) | |
| *C08J 5/18* | (2006.01) | |

(52) U.S. Cl.
CPC .......... *C08L 23/12* (2013.01); *C08F 4/61912* (2013.01); *C08F 4/61916* (2013.01); *C08F 4/65927* (2013.01); *C08F 4/7042* (2013.01); *C08J 5/18* (2013.01); *C08L 23/0815* (2013.01); *C08L 23/10* (2013.01); *C08L 23/16* (2013.01); *C08J 2323/16* (2013.01); *C08J 2423/06* (2013.01); *C08J 2423/12* (2013.01); *C08L 2205/02* (2013.01); *C08L 2205/03* (2013.01); *C08L 2314/06* (2013.01); *C08L 2314/08* (2013.01); *Y10T 428/139* (2015.01)

(58) Field of Classification Search
CPC ...... C08L 23/12; C08L 23/0815; C08L 23/10; C08L 23/16; C08L 2205/02; C08L 2205/03; C08L 2314/06; C08L 2314/08; C08J 5/18; C08J 2323/16; C08J 2423/06; C08J 2423/12; Y10T 428/139
See application file for complete search history.

(56) References Cited

U.S. PATENT DOCUMENTS

| | | |
|---|---|---|
| 2002/0058584 A1 | 5/2002 | Bennett et al. |
| 2011/0136982 A1 | 6/2011 | Tse et al. |
| 2012/0165472 A1* | 6/2012 | Massari et al. ..... C08F 297/083 525/240 |

FOREIGN PATENT DOCUMENTS

| | | |
|---|---|---|
| EP | 2177543 A1 | 4/2010 |
| WO | WO2005103099 A1 | 11/2005 |

OTHER PUBLICATIONS

PCT International Search Report & Written Opinion mailed Oct. 1, 2013, for PCT/EP2013/062686.

* cited by examiner

*Primary Examiner* — Nathan M Nutter

(57) ABSTRACT

A two steps polymerization process for obtaining a polyolefin composition comprising:
a) from 25 wt % to 70 wt % of a propylene homopolymer or a propylene-ethylene copolymer containing from 0.1 wt % to 10 wt % of ethylene derived units;
b) from 27 wt % to 70 wt % of a copolymer of ethylene and at least one $C_3$-$C_{20}$ alpha olefins, wherein the ethylene derived units content ranges from 15 wt % to 70 wt %;
c) from 3 wt % to 20 wt % of polyethylene homopolymer or an ethylene and at least one $C_3$-$C_{20}$ alpha olefins copolymer;
the sum a)+b)+c) being 100,
wherein said process comprises:
step a) contacting under polymerization conditions propylene, optionally ethylene and the catalyst system in order to obtain component a),
step b) contacting under polymerization conditions ethylene and at least one C3-C20 alpha-olefins and the catalyst system in order to obtain components b) and c);
wherein the catalyst system comprises a metallocene compound and an iron complex.

12 Claims, No Drawings

PROCESS FOR THE OBTAINMENT OF A POLYOLEFIN COMPOSITION

This application is the U.S. National Phase of PCT International Application PCT/EP2013/062686, filed Jun. 19, 2013, claiming benefit of priority to European Patent Application No. 12172508.9, filed Jun. 19, 2012, and benefit of priority under 35 U.S.C. §119(e) of U.S. Provisional Application No. 61/662,286 filed Jun. 20, 2012, the contents of which are incorporated herein by reference in their entirety.

FIELD OF THE INVENTION

The present invention relates to a polymerization process for the obtainment of a polyolefin based composition comprising an heterophasic propylene based polymer and polyethylene.

BACKGROUND OF THE INVENTION

Polyolefin compositions comprising an heterophasic propylene polymer and polyethylene are well known in the art. For example WO 2006/067023 relates to a polypropylene composition comprising (per cent by weight):
a) 50-77% of a crystalline propylene polymer;
b) 13-28% of an elastomeric copolymer of ethylene and propylene; and
c) 10-22% of polyethylene.

WO 2006/125720 relates to a propylene polymer composition comprising (per cent by weight):
a) 65-77% of a crystalline propylene polymer,
b) 8 to less than 13% of an elastomeric copolymer of ethylene and propylene; and
c) 10-23% of polyethylene.

These composition are obtained by using Ziegler Natta catalyst with a three steps process, one for each component of the composition.

Even metallocene based catalyst systems have been used for the obtainment of such three components compositions, for example in EP 646 624 examples 21 and 22 this kind of composition is exemplified, however there is always the need of a three steps process or to blend the three components in order to obtain the composition.

SUMMARY OF THE INVENTION

The applicant found that a composition comprising a polypropylene matrix an ethylene rubber and polyethylene can be advantageously obtained with a two steps process by using a particular catalyst system.

DETAILED DESCRIPTION OF THE INVENTION

Thus an object of the present invention is a two steps polymerization process for obtaining a polyolefin composition comprising:
a) from 25 wt % to 70 wt % of a propylene homopolymer or a propylene-ethylene copolymer containing from 0.1 wt % to 10 wt %; preferably from 0.1 wt % to 5 wt % of ethylene derived units;
b) from 27 wt % to 70 wt % of a copolymer of ethylene and at least one $C_3$-$C_{20}$ alpha olefins, wherein the ethylene derived units content ranges from 15 wt % to 70 wt %;
c) from 3 wt % to 20 wt % of polyethylene homopolymer or an ethylene and at least one $C_3$-$C_{20}$ alpha olefins copolymer containing from 99.9 wt % to 95.0 wt % of ethylene derived units,
wherein the at least one $C_3$-$C_{20}$ alpha olefins comonomer is the same used in component b); the sum a)+b)+c) being 100
wherein said process comprises:
step a) contacting under polymerization conditions propylene, optionally ethylene and the catalyst system in order to obtain component a)
step b) contacting under polymerization conditions ethylene and at least one $C_3$-$C_{20}$ alpha olefins and the catalyst system in order to obtain components b) and c);
wherein the catalyst system comprises:
i) a metallocene compound of formula (I)

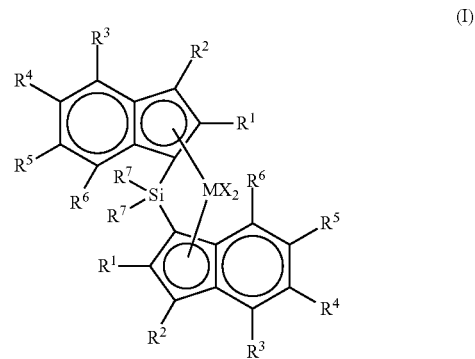

Wherein
M is titanium zirconium or hafnium;
X, same or different, is a hydrogen atom, a halogen atom, or a R, OR, $OSO_2CF_3$, OCOR, SR, $NR_2$ or $PR_2$ group, wherein R is a linear or branched, cyclic or acyclic, $C_1$-$C_{40}$-alkyl, $C_2$-$C_{40}$ alkenyl, $C_2$-$C_{40}$ alkynyl, $C_6$-$C_{40}$-aryl, $C_7$-$C_{40}$-alkylaryl or $C_7$-$C_{40}$-arylalkyl radicals; optionally containing heteroatoms belonging to groups 13-17 of the Periodic Table of the Elements; preferably R is a linear or branched $C_1$-$C_{20}$-alkyl radical; or two X can optionally form a substituted or unsubstituted butadienyl radical or a OR'O group wherein R' is a divalent radical selected from $C_1$-$C_{40}$ alkylidene, $C_6$-$C_{40}$ arylidene, $C_7$-$C_{40}$ alkylarylidene and $C_7$-$C_{40}$ arylalkylidene radicals; preferably X is fluorine, chlorine, bromine, iodine or a C1-C10-alkyl radical such as methyl, ethyl, propyl or butyl radical;
$R^1$, $R^2$, $R^3$, $R^4$, $R^5$, $R^6$ and $R^7$, equal to or different from each other, are hydrogen atoms or $C_1$-$C_{40}$ hydrocarbon radicals optionally containing heteroatoms belonging to groups 13-17 of the Periodic Table of the Elements; or two or more groups between $R^1$, $R^2$, $R^3$, $R^4$, $R^5$ and $R^6$ can be fused to form a saturated or unsaturated, 5 or 6 membered rings, said ring can bear $C_1$-$C_{20}$ alkyl radicals as substituents; preferably $R^1$, $R^2$, $R^3$, $R^4$, $R^5$ and $R^6$ are hydrogen atoms or $C_1$-$C_{20}$-alkyl, $C_2$-$C_{20}$-alkenyl, $C_6$-$C_{20}$-aryl, $C_7$-$C_{40}$-alkylaryl, $C_7$-$C_{40}$-arylalkyl radicals optionally containing heteroatoms belonging to groups 13-17 of the Periodic Table of the Elements; or two or more groups between $R^1$, $R^2$, $R^3$, $R^4$, $R^5$ and $R^6$ can be fused to form a saturated or unsaturated, 5 or 6 membered rings, said ring can bear $C_1$-$C_{20}$ alkyl radicals as substituents;

ii) at least one iron complex of the general formula (II)

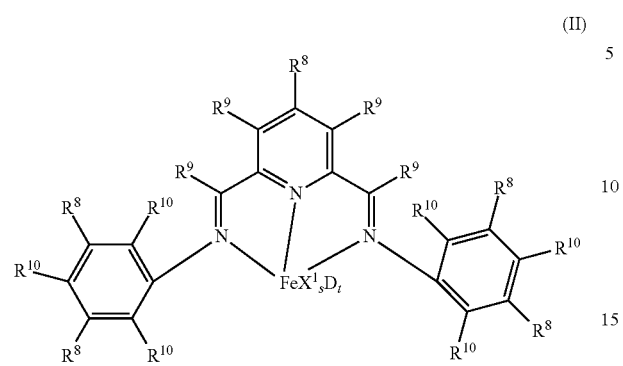

Wherein:
the radicals $X^1$, equal to or different from each other, are hydrogen atoms, halogen atoms, R, OR, $OSO_2CF_3$, OCOR, SR, $NR_2$ or $PR_2$ groups, wherein R is a linear or branched, saturated or unsaturated $C_1$-$C_{20}$ alkyl, $C_3$-$C_{20}$ cycloalkyl, $C_6$-$C_{20}$ aryl, $C_7$-$C_{20}$ alkylaryl or $C_7$-$C_{20}$ arylalkyl radical, optionally containing heteroatoms belonging to groups 13-17 of the Periodic Table of the Elements; or two $X^1$ can optionally form a substituted or unsubstituted butadienyl radical or a OR'O group wherein R' is a divalent radical selected from $C_1$-$C_{20}$ alkylidene, $C_6$-$C_{40}$ arylidene, $C_7$-$C_{40}$ alkylarylidene and $C_7$-$C_{40}$ arylalkylidene radicals; preferably $X^1$ is a hydrogen atom, a halogen atom or a R group; more preferably X is chlorine or a methyl radical;

D is an uncharged donor; s is 1, 2, 3 or 4, preferably s is 2 or 3; t ranges from 0 to 4, preferably t is 0, 1 or 2.

$R^8$, equal to or different from each other, are hydrogen atoms or $C_1$-$C_{40}$ hydrocarbon radicals optionally containing heteroatoms belonging to groups 13-17 of the Periodic Table of the Elements; preferably $R^8$ are hydrogen atoms or linear or branched, cyclic or acyclic, $C_1$-$C_{40}$-alkyl, $C_2$-$C_{40}$ alkenyl, $C_2$-$C_{40}$ alkynyl, $C_6$-$C_{40}$-aryl, $C_7$-$C_{40}$-alkylaryl or $C_7$-$C_{40}$-arylalkyl radicals optionally containing heteroatoms belonging to groups 13-17 of the Periodic Table of the Elements; more preferably $R^8$ are hydrogen atoms or $C_1$-$C_{10}$-alkyl radicals;

$R^{10}$, equal to or different from each other, are hydrogen atoms or $C_1$-$C_{40}$ hydrocarbon radicals optionally containing heteroatoms belonging to groups 13-17 of the Periodic Table of the Elements; preferably $R^{10}$ are hydrogen atoms or linear or branched, cyclic or acyclic, $C_1$-$C_{40}$-alkyl, $C_2$-$C_{40}$ alkenyl, $C_2$-$C_{40}$ alkynyl, $C_6$-$C_{40}$-aryl, $C_7$-$C_{40}$-alkylaryl or $C_7$-$C_{40}$-arylalkyl radicals optionally containing heteroatoms belonging to groups 13-17 of the Periodic Table of the Elements; more preferably $R^{10}$ are $C_1$-$C_{10}$-alkyl radicals such as methyl or isopropyl radicals;

$R^9$, equal to or different from each other, are hydrogen atoms, halogen atoms, preferably chlorine, or $C_1$-$C_{40}$ hydrocarbon radicals optionally containing heteroatoms belonging to groups 13-17 of the Periodic Table of the Elements; preferably $R^9$ are hydrogen atoms halogen atoms or linear or branched, cyclic or acyclic, $C_1$-$C_{40}$-alkyl, $C_2$-$C_{40}$ alkenyl, $C_2$-$C_{40}$ alkynyl, $C_6$-$C_{40}$-aryl, $C_7$-$C_{40}$-alkylaryl or $C_7$-$C_{40}$-arylalkyl radicals optionally containing heteroatoms belonging to groups 13-17 of the Periodic Table of the Elements; more preferably $R^9$ are $C_1$-$C_{10}$-alkyl radicals such as methyl or ethyl or halogen atoms, preferably chlorine;

iii) an alumoxane or a compound capable of forming an alkyl cation with complexes of formula (I) and (II);

The ratio between the compound of formula I) and II) depends from the wished product to be obtained. As a general rule the molar ratio between the metallocene compound of formula (I) and the iron complex of formula (II) (M/Fe ratio) ranges from 1:1 to 50:1; preferably from 2:1 to 10:1; more preferably from 3:1 to 10:1.

Preferably the metallocene compound of formula (I) is in the racemic (rac) or racemic-like form. The terms racemic or racemic-like are defined in WO03/046022.

Preferably the compound of formula (I) has formula (Ia)

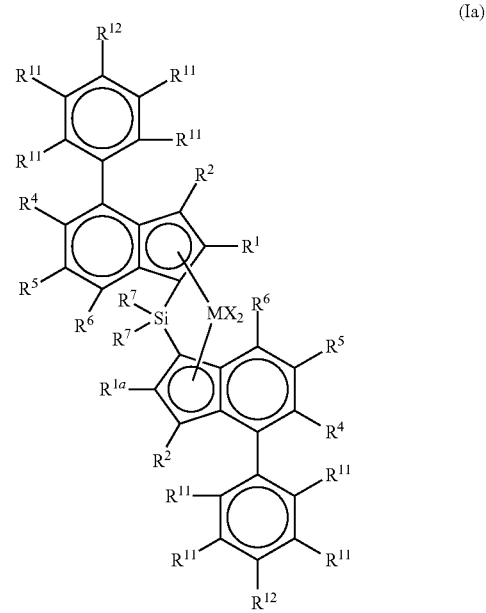

Wherein
M, X, $R^1$, $R^2$, $R^4$, $R^5$, $R^6$ and $R^7$, have been described above;
$R^{1a}$ is a moiety of formula (III)

Wherein
The symbol * marks the bound with the cyclopentadienyl moiety; $R^{13}$, equal to or different from each other, is a $C_1$-$C_{15}$ hydrocarbon radical optionally containing heteroatoms belonging to groups 13-17 of the Periodic Table of the Elements; preferably $R^{13}$ is a $C_1$-$C_{10}$ alkyl radical.

$R^{14}$ is a hydrogen atom or a $C_1$-$C_{15}$ hydrocarbon radical optionally containing heteroatoms belonging to groups 13-17 of the Periodic Table of the Elements; preferably $R^{14}$ is a hydrogen atoms or a $C_1$-$C_{10}$ alkyl radical; more preferably $R^{14}$ is a hydrogen atom;

$R^{11}$ and $R^{12}$, equal to or different from each other are hydrogen atoms or $C_1$-$C_{10}$ hydrocarbon radicals optionally containing heteroatoms belonging to groups 13-17 of the Periodic Table of the Elements; preferably $R^{11}$ and $R^{12}$ are hydrogen atoms or $C_1$-$C_{10}$ alkyl radicals; more preferably R$^{11}$ is a hydrogen atom and; R$^{12}$ is a hydrogen atom or a C$_1$-C$_{10}$ alkyl radical such as methyl, ethyl isopropyl or terbutyl radical.

More preferably the compound of formula (Ia) has formula (Ib)

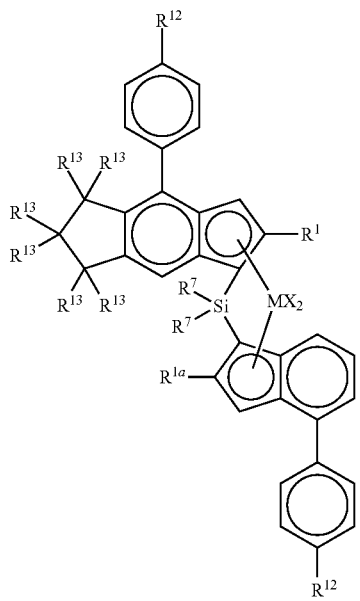

(Ib)

Wherein

M, X, R$^1$, R$^{1a}$, R$^7$ and R$^{12}$ have been described above; R$^{13}$, equal to or different from each other, is hydrogen atom, or a C$_1$-C$_{10}$ hydrocarbon radical; preferably R$_{13}$ is hydrogen atom or a C$_1$-C$_5$ alkyl radical; more preferably R$_{13}$ is hydrogen atom.

Alumoxanes used as component b) or c) in the above processes can be obtained by reacting water with an organo-aluminium compound of formula H$_j$AlU$_{3-j}$ or H$_j$Al$_2$U$_{6-j}$, where the U substituents, same or different, are hydrogen atoms, halogen atoms, C$_1$-C$_{20}$-alkyl, C$_3$-C$_{20}$-cycloalkyl, C$_6$-C$_{20}$-aryl, C$_7$-C$_{20}$-alkylaryl or C$_7$-C$_{20}$-arylalkyl radicals, optionally containing silicon or germanium atoms, with the proviso that at least one U is different from halogen, and j ranges from 0 to 1, being also a non-integer number. In this reaction the molar ratio of Al/water is preferably comprised between 1:1 and 100:1.

The alumoxanes used in the process according to the invention are considered to be linear, branched or cyclic compounds containing at least one group of the type:

wherein the substituents U, same or different, are defined above.

In particular, alumoxanes of the formula:

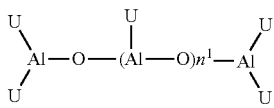

can be used in the case of linear compounds, wherein n$^1$ is 0 or an integer from 1 to 40 and the substituents U are defined as above; or alumoxanes of the formula:

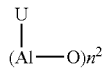

can be used in the case of cyclic compounds, wherein n2 is an integer from 2 to 40 and the U substituents are defined as above.

Examples of alumoxanes suitable for use according to the present invention are methylalumoxane (MAO), tetra-(isobutyl)alumoxane (TIBAO), tetra-(2,4,4-trimethyl-pentyl)alumoxane (TIOAO), tetra-(2,3-dimethylbutyl)alumoxane (TDMBAO) and tetra-(2,3,3-trimethylbutyl)alumoxane (TTMBAO).

Particularly interesting cocatalysts are those described in WO 99/21899 and in WO01/21674 in which the alkyl and aryl groups have specific branched patterns.

Non-limiting examples of aluminium compounds that can be reacted with water to give suitable alumoxanes (b), described in WO 99/21899 and WO01/21674, are:

tris(2,3,3 trimethyl-butyl)aluminium, tris(2,3 dimethyl-hexyl)aluminium, tris(2,3 dimethyl-butyl)aluminium, tris (2,3 dimethyl-pentyl)aluminium, tris(2,3 dimethyl-heptyl)aluminium, tris(2 methyl-3-ethyl-pentyl)aluminium, tris(2 methyl-3-ethyl-hexyl)aluminium, tris(2 methyl-3-ethyl-heptyl)aluminium, tris(2 methyl-3-propyl-hexyl) aluminium, tris(2 ethyl-3-methyl-butyl)aluminium, tris(2 ethyl-3-methyl-pentyl)aluminium, tris(2,3 diethyl-pentyl) aluminium, tris(2 propyl-3-methyl-butyl)aluminium, tris(2 isopropyl-3-methyl-butyl)aluminium, tris(2 isobutyl-3-methyl-pentyl)aluminium, tris(2,3,3 trimethyl-pentyl)aluminium, tris(2,3,3 trimethyl-hexyl)aluminium, tris(2 ethyl-3,3-dimethyl-butyl)aluminium, tris(2 ethyl-3,3-dimethyl-pentyl)aluminium, tris(2 isopropyl-3,3-dimethyl-butyl)aluminium, tris(2 trimethylsilyl-propyl)aluminium, tris(2 methyl-3-phenyl-butyl)aluminium, tris(2 ethyl-3-phenyl-butyl)aluminium, tris(2,3 dimethyl-3-phenyl-butyl)aluminium, tris(2-phenyl-propyl)aluminium, tris[2-(4-fluoro-phenyl)-propyl]aluminium, tris[2-(4-chloro-phenyl)-propyl]aluminium, tris[2-(3-isopropyl-phenyl)-propyl]aluminium, tris(2-phenyl-butyl)aluminium, tris(3 methyl-2-phenyl-butyl) aluminium, tris(2-phenyl-pentyl)aluminium, tris[2-(pentafluorophenyl)-propyl]aluminium, tris[2,2-diphenyl-ethyl]aluminium and tris[2-phenyl-2-methyl-propyl]aluminium, as well as the corresponding compounds wherein one of the hydrocarbyl groups is replaced with a hydrogen atom, and those wherein one or two of the hydrocarbyl groups are replaced with an isobutyl group.

Amongst the above aluminium compounds, trimethylaluminium (TMA), triisobutylaluminium (TIBA), tris(2,4,4-trimethyl-pentyl)aluminium (TIOA), tris(2,3-dimethylbutyl)aluminium (TDMBA) and tris(2,3,3-trimethylbutyl) aluminium (TTMBA) are preferred.

Non-limiting examples of compounds able to form an alkylmetallocene cation are compounds of formula D+E−, wherein D+ is a Brønsted acid, able to donate a proton and to react irreversibly with a substituent X of the metallocene of formula (I) and E− is a compatible anion, which is able to stabilize the active catalytic species originating from the reaction of the two compounds, and which is sufficiently labile to be removed by an olefinic monomer. Preferably, the anion E− comprises one or more boron atoms. More preferably, the anion E− is an anion of the formula BAr4(−), wherein the substituents Ar which can be identical or different are aryl radicals such as phenyl, pentafluorophenyl or bis(trifluoromethyl)phenyl. Tetrakis-pentafluorophenyl borate is particularly preferred compound, as described in WO 91/02012. Moreover, compounds of formula BAr3 can be conveniently used. Compounds of this type are described, for example, in the International patent application WO 92/00333. Other examples of compounds able to form an alkylmetallocene cation are compounds of formula BAr3P wherein P is a substituted or unsubstituted pyrrol radical. These compounds are described in WO01/62764. Compounds containing boron atoms can be conveniently supported according to the description of DE-A-19962814 and DE-A-19962910. All these compounds containing boron atoms can be used in a molar ratio between boron and the metal of the metallocene comprised between about 1:1 and about 10:1; preferably 1:1 and 2.1; more preferably about 1:1.

Non limiting examples of compounds of formula D+E− are:
Tributylammoniumtetra(pentafluorophenyl)aluminate,
Tributylammoniumtetra(trifluoromethylphenyl)borate,
Tributylammoniumtetra(4 fluorophenyl)borate,
N,N-Dimethylbenzylammonium-tetrakispentafluorophenyl-borate,
N,N-Dimethylhexylamonium-tetrakispentafluorophenylborate,
N,N Dimethylaniliniumtetrakis(pentafluorophenyl)borate,
N,N Dimethylaniliniumtetrakis(pentafluorophenyl)aluminate,
N,N-Dimethylbenzylammonium-tetrakispentafluorophenyl-borate,
N,N-Dimethylhexylamonium-tetrakispentafluorophenylborate,
Di(propyl)ammoniumtetrakis(pentafluorophenyl)borate,
Di(cyclohexyl)ammoniumtetrakis(pentafluorophenyl)borate,
Triphenylcarbeniumtetrakis(pentafluorophenyl)borate,
Triphenylcarbeniumtetrakis(pentafluorophenyl)aluminate,
Ferroceniumtetrakis(pentafluorophenyl)borate,
Ferroceniumtetrakis(pentafluorophenyl)aluminate.
Triphenylcarbeniumtetrakis(pentafluorophenyl)borate, and
N,N Dimethylaniliniumtetrakis(pentafluorophenyl)borate.

Preferably the composition obtainable with the process of the present comprises:
a) from 30 wt % to 50 wt % of a propylene homopolymer or a propylene-ethylene copolymer containing from 0.1 wt % to 5 wt % of ethylene derived units;
b) from 40 wt % to 65 wt % of a copolymer of ethylene and at least one $C_3$-$C_{20}$ alpha olefins, wherein the ethylene derived units content ranges from 15 wt % to 70 wt %; preferably from 20 wt % to 65 wt %;
c) from 3 wt % to 7 wt % of polyethylene homopolymer or an ethylene and at least one $C_3$-$C_{20}$ alpha olefins copolymer containing from 99.9 wt % to 95.0 wt % of ethylene wherein the at least one $C_3$-$C_{20}$ alpha olefins comonomer is the same used in component b);
the sum a)+b)+c) being 100;

Examples of $C_3$-$C_{20}$ alpha olefins are propylene, 1-butene, 1-hexene, 1-ottene; preferred monomer is propylene.

The catalysts system to be used in the process of the present invention can be supported on an inert carrier. This is achieved by depositing metal complex A) and the iron complex B) or the product of the reaction thereof with the component C), or the component C) and then metal complex A) and the iron complex B) on an inert support. The support can be a porous solid such as talc, a sheet silicate, an inorganic oxide or a finely divided polymer powder (e.g. polyolefin). Suitable inorganic oxides may be found among the oxides of elements of groups 2, 3, 4, 5, 13, 14, 15 and 16 of the Periodic Table of the Elements. Examples of oxides preferred as supports include silicon dioxide, aluminum oxide, and also mixed oxides of the elements calcium, aluminum, silicon, magnesium or titanium and also corresponding oxide mixtures, magnesium halides, styrene/divinylbenzene copolymers, polyethylene or polypropylene. Other inorganic oxides which can be used alone or in combination with the abovementioned preferred oxidic supports are, for example, MgO, ZrO2, TiO2 or B2O3.

A suitable class of supports which can be used is that constituted by porous organic supports functionalized with groups having active hydrogen atoms. Particularly suitable are those in which the organic support is a partially cross-linked styrene polymer. Supports of this type are described in European application EP-633 272.

Another class of inert supports particularly suitable for use according to the invention is that of polyolefin porous prepolymers, particularly polyethylene.

The support materials used preferably have a specific surface area in the range from 10 to 1000 m2/g, a pore volume in the range from 0.1 to 5 ml/g and a mean particle size of from 1 to 500 m. Preference is given to supports having a specific surface area in the range from 50 to 500 m2/g, a pore volume in the range from 0.5 to 3.5 ml/g and a mean particle size in the range from 5 to 350 m. Particular preference is given to supports having a specific surface area in the range from 200 to 400 m2/g, a pore volume in the range from 0.8 to 3.0 ml/g and a mean particle size of from 10 to 300 μm.

The inorganic support can be subjected to a thermal treatment, e.g. to remove adsorbed water. Such a drying treatment is generally carried out at from 80 to 300° C., preferably from 100 to 200° C., with drying at from 100 to 200° C. preferably being carried out under reduced pressure and/or a blanket of inert gas (e.g. nitrogen), or the inorganic support can be calcined at from 200 to 1 000° C. to produce the desired structure of the solid and/or set the desired OH concentration on the surface. The support can also be treated chemically using customary desiccants such as metal alkyls, preferably aluminum alkyls, chlorosilanes or SiCl4, or else methylaluminoxane.

Appropriate treatment methods are described, for example, in WO 00/31090. The inorganic support material can also be chemically modified. For example, treatment of silica gel with (NH4)2SiF6 leads to fluorination of the silica gel surface, or treatment of silica gels with silanes containing nitrogen-, fluorine- or sulfur-containing groups leads to correspondingly modified silica gel surfaces.

Organic support materials such as finely divided polyolefin powders (e.g. polyethylene, polypropylene or polystyrene) can also be used and are preferably likewise freed of adhering moisture, solvent residues or other impurities by means of appropriate purification and drying operations before use. It is also possible to use functionalized polymer supports, e.g. supports based on polystyrene, via whose functional groups, for example ammonium or hydroxy groups, at least one of the catalyst components can be immobilized. The solid compound obtained by supporting the catalyst system object of the present invention on a carrier in combination with the further addition of the alkylaluminium compound either as such or prereacted with water if necessary, can be usefully.

Preferred support is silica.

With the catalyst of the present invention it is possible to obtain a three components composition with a two steps polymerization process, furthermore due to the presence of the component c) that act as compatibilizer it is also possible to obtain a composition that is richer in component b) (the rubber) as reactor without being sticky. Mainly, component c) is produced in the second polymerization step. Furthermore the presence of component c) enhances the compatibility between component a) and b) so that to have a final composition having a better homogeneity. The composition obtained with the process of the present invention can be used in extrusion processes for obtaining extruded articles such as films, pipes, fibers, sheets, profiles and the like, in injection molding processes such as injection molding, blow molding, rotomolding and the like for obtaining molded articles such as for example, automotive parts, bumpers, cases for battery, containers and the like or it can be used in thermoformed processes for obtaining thermoformed articles.

EXAMPLES

The following examples are given to illustrate the present invention without limiting purpose.

Crystaf Analysis

Crystallization Analysis Fractionation (CRYSTAF) technique involves dissolving a sample in a solvent at high temperature, then cooling the solution slowly to cause fractionation of the sample based on solubility. For semicrystalline samples, including blends, solubility depends primarily on crystallizability: portions of the sample that are more crystalline will precipitate out of solution at a higher temperature than portions of the sample that are less crystalline.

The relative amount of sample in solution as a function of temperature is measured using an infrared (IR) detector to obtain the cumulative solubility distribution. The soluble fraction (SF) is defined as the IR signal at the lowest temperature (at 0° C.) divided by the IR signal when all the sample is dissolved at high temperature, and corresponds to the weight fraction of sample that has not crystallized.

A commercial CRYSTAF 200 instrument (Polymer Char S. A., Valencia, Spain) with five stirred stainless steel vessels of 60 mL volume was used to perform this test. The technique is outlined in Harald Pasch*, Robert Brüll[2], Udo Wahner[2], Benjamin Monrabal[3] MACROMOL. MATER. ENG. 279, 46-51 (2000).

In contrast to the procedure in the literature given approximately 15 mg of sample were dissolved for 60 min at 160° C. in 30 mL of 1,2-dichlorobenzene. The solution was then stabilized for 90 min at 95° C.

The crystallization was carried out from 95 to 30° C. at a crystallization rate of 0.1° C./min. A dual wavelength infrared detector with a heated flow through cell maintained at 150° C. was used to measure the polymer concentration in solution at regular intervals during the crystallization cycle; the measuring wavelength was 3.5 μm and the reference wavelength was 3.6 μm. The cumulative soluble concentration is measured as the polymer crystallizes while the temperature is decreased.

The CRYSTAF peak temperature and area are identified by the peak analysis module included in the CRYSTAF Software (Version 200 Lb^ PolymerChar, Valencia, Spain). The CRYSTAF peak finding routine identifies a peak temperature as a maximum in the dW/dT and the area between the largest positive inflections on either side of the identified peak in the derivative curve.

Polyethylene Homopolymer (HDPE) Content (Component c)

The HDPE content has been measured by subjecting each fraction to the Crystaf® analysis, the fraction detected at a temperature higher than 80° C. was considered as HDPE.

Propylene Homopolymer Content (Component a)

The propylene homopolymer content has been measured by subjecting each fraction to the Crystaf® analysis, the fraction detected at a temperature comprised between 60° C. and 80° C. was considered as propylene homopolymer.

MFR

The Melt Flow Rate was determined at 190° C. under a load of 21.6 kg (190° C./21.6 kg) in accordance with ISO 1133.

GPC

The determination of the molar mass distributions and the means $M_n$, $M_w$, $M_z$ and $M_w/M_n$ derived therefrom was carried out by means of high-temperature gel permeation chromatography on a WATERS 150 C using a method based on DIN 55672 and the following columns connected in series: 3× SHODEX AT 806 MS, 1× SHODEX UT 807 and 1× SHODEX AT-G under the following conditions: solvent: 1,2,4-trichlorobenzene (stabilized with 0.025% by weight of 2,6-di-tert-butyl-4-methylphenol), flow: 1 ml/min, 500 ml injection volume, temperature: 140° C. The columns were calibrated with polyethylene standards with molar masses of from 100 bis $10^7$ g/mol. The evaluation was carried out by using the Win-GPC software of Fa. HS-Entwicklungsgesellschaft für wissenschaftliche Hard- und Software mbH, Ober-Hilbersheim.

Xylene Soluble and Insoluble Fractions 2.5 g of polymer and 250 cm$^3$ of xylene are introduced in a glass flask equipped with a refrigerator and a magnetical stirrer. The temperature is raised in 30 minutes up to the boiling point of the solvent. The so obtained clear solution is then kept under reflux and stirring for further 30 minutes. The closed flask is then kept for 30 minutes in a bath of ice and water and in thermostatic water bath at 25° C. for 30 minutes as well. The so formed solid is filtered on quick filtering paper. 100 cm$^3$ of the filtered liquid is poured in a previously weighed aluminum container which is heated on a heating plate under nitrogen flow, to remove the solvent by evaporation. The container is then kept in an oven at 80° C.

under vacuum until constant weight is obtained. The weight percentage of polymer soluble in xylene at room temperature is then calculated.

Preparation of the Mixed Catalyst Systems:

Component i) is Me$_2$Si(2-Me-4-Ph-tetrahydro-s-indacenyl)(2-iPr-4-(4-tBuPh)-Ind)ZrMe$_2$) was prepared according to the description of preparation of metallocene 2 of WO 2005/058916.

Component ii) 2 is 2,6-Bis[1-(2-Chlor-2,4,6-trimethyl-phenylimino)ethyl]pyridine iron(II) dichloride. It was prepared as in example 1 of WO 98/27124 and reacted in an analogous manner with iron(II) chloride to said complex 2.

Methylalumoxane (MAO) was received from Chemtura Inc. as a 30% (w/w) toluene solution.

Support:
XPO-2326A, a spray-dried silica gel from Grace
Support pretreatment XPO-2326 A was calcinated at 600° C. for 6 hours.

Preparation of the Catalyst System:

361.2 mg of complex 1 and 26.1 mg of complex 2 and 3,4 ml of toluene were placed in a 50 ml flask. 11.4 ml of MAO (30% in toluene) was added to this mixture. The solution was stirred for 20 min at ambient temperature. A 250 ml flask was loaded with 9.2 g of calcinated XPO-2326A and cooled to 0° C. The red colored complex/MAO solution was successively added at vigorous stirring within 5 min. The powder was continuously stirred for 1 hour. 60 ml of heptane were added to the strawberry red powder, resulting a slurry, which was transferred into a glass frit. The solvent was filtered of and the solid dried in a continues Ar stream until a free flowing powder was obtained. 17.3 g of strawberry red powder having 28.9% of volatiles was obtained. The ratio of loadings of compound i) and that of compound ii) is E μmol/g:μmol/g and the Al/(compound i)+compound ii)) ratio is F:1 mol:mol as reported on table 1.

| Catalyst | E compl1:compl2 μmol/g:μmol/g | F Al:Zr + Fe (mol:mol) |
|---|---|---|
| 1 | 55/5 | 98 |

Polymerization:

A 10 l batch autoclave was pressurized and vented one time with dry nitrogen and 3 times with propylene up to a pressure of 5 bar-g. After the autoclave being conditioned, 30 ml of TiBA (triisobutylaluminum)(50% solution in Toluene), hydrogen as indicated in table 2 and 500 g of liquid propylene were introduced at 30° C. 136 mg of neat catalyst prepared as described above were flushed into the reactor using another 1000 g of liquid propylene. The reactor temperature was raised to 65° C. and kept constant for a time indicated in table 2. After that the pressure was decreased to 0.3 bar-g by venting off all volatiles. The reactor was pressurized with 5 bar-g of nitrogen and vented again. In the following step a gas mixture of propylene and of ethylene in table 2 was introduced until a pressure of 21 bar-g was reached. The pressure was kept constant by feeding the said gas mixture for a time indicated in table 2. After that all volatiles were released and the autoclave was pressurized and vented 3 times with dry nitrogen. 1270 g of polymer, a free flowing powder, were discharged from the autoclave through its bottom discharge valve. Resulting a yield of 9.4 kg/gh. The polymerization conditions are indicated in table 2 and the characteristics of the polymer obtained are indicated in table 3.

TABLE 2

| Ex | | 4.6-104 Ref* | 4.6-076 1 | 4.6-077 2 | 4.6-078 3 | 4.6-079 4 | 4.6-085 5 |
|---|---|---|---|---|---|---|---|
| Gas phase composition | | | | | | | |
| C2 | Mol % | 60 | 70 | 60 | 50 | 40 | 20 |
| C3 | Mol % | 40 | 30 | 40 | 50 | 60 | 80 |
| Step a | Min | 22 | 15 | 15 | 15 | 15 | 15 |
| Step b | min | 67 | 45 | 45 | 45 | 45 | 45 |
| Polymerization activity | Kgpol/g catxh | 3.7 | 9.4 | 6.0 | 6.0 | 6.6 | 6.2 |

C2 ethylene, C3 propylene, H2 hydrogen
*the reference example was carried out with a catalyst system prepared as above described but without component ii)

TABLE 3

| Ex | | 4.6-104 Ref* | 4.6-076 1 | 4.6-077 2 | 4.6-078 3 | 4.6-079 4 | 4.6-085 5 |
|---|---|---|---|---|---|---|---|
| MFR | g/10' | <0.1 | 0.9 | 0.5 | 0.1 | 4.8 | <0.1 |
| IV | dl/g | 3.1 | 2.5 | 2.8 | 3.2 | 2.6 | 3.8 |
| PE | wt % | 0 | 2.8 | 4.1 | 5.2 | 3.6 | 3.2 |
| PP | wt % | 24 | 32 | 36 | 28 | 29 | 25 |
| Rubber * | wt % | 76 | 65.2 | 59.9 | 66.8 | 67.4 | 71.8 |
| C2 rubber | wt % | 32 | 21 | 26 | 36 | 47 | 63 |
| XS | Wt % | 70 | 59 | 51 | 56 | 50 | 60 |
| Mw/Mn | | 2.2 | 17.9 | 8.0 | 8.1 | 20.0 | 3.1 |
| Mw | | 418062 | 334756 | 338581 | 384364 | 328737 | 525001 |

PP polypropylene (component a)
PE polyethylene (component b)
Rubber ethylene copolymer (component c)
XS solubles in xylene at 25° C.
* the percentage of rubber is calculated from the percentage of PP and PE

What is claimed is:

1. A process for obtaining a polyolefin composition comprising:
   A) contacting in a first polymerization step comprising a pressurized reactor propylene and optionally ethylene optionally in gas phase and a catalyst system to obtain an overall content of a first component (a) ranging from 25-70 wt %, based on the total wt % of the polyolefin composition, wherein the first component (a) is a propylene homopolymer, or a propylene-ethylene copolymer comprising 0.1-10 wt % of ethylene;
   B) further contacting in a second polymerization step comprising the pressurized reactor of step A) ethylene and at least one $C_3$-$C_{20}$ alpha olefin optionally in gas phase and the catalyst system to obtain an overall content of a second component (b) ranging from 27-70 wt %, based on the total wt % of the polyolefin composition, wherein the second component (b) is an ethylene copolymer comprising 15-70 wt % ethylene and at least one $C_3$-$C_{20}$ alpha-olefin, and an overall content of a third component (c) ranging from 3-20 wt %, based on the total wt % of the polyolefin composition, wherein the third component (c) is polyethylene homopolymer or copolymer comprising 95-99.9 wt % ethylene and at least one $C_3$-$C_{20}$ alpha-olefin, wherein the at least one $C_3$-$C_{20}$ alpha-olefin comonomer is the same used in component b) to form a polyolefin composition; and
   C) discharging the polyolefin composition:
   wherein the catalyst system comprises:
   i) a metallocene compound of the general formula (I):

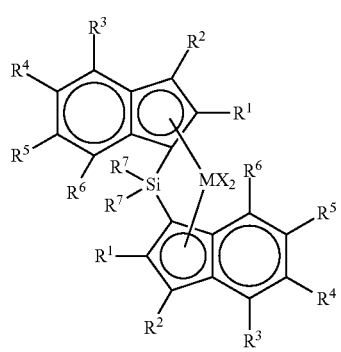

wherein M is selected from the group consisting of titanium, zirconium and hafnium;

X, whether the same or different, is selected from the group consisting of hydrogen, a halide, an —R, —OR, —SO$_3$CF$_3$, —CO$_2$R, —SR, —NR$_2$ and —PR$_2$ group, wherein R is selected from the group consisting of a linear or branched, cyclic or acyclic, $C_1$-$C_{40}$ alkyl, $C_2$-$C_{40}$ alkenyl, $C_2$-$C_{40}$ alkynyl, $C_6$-$C_{40}$ alkylaryl and $C_7$-$C_{40}$ alkylaryl and $C_7$-$C_{40}$ arylalkyl radicals; optionally comprising heteroatoms from Groups 13-17 of the Periodic Table of Elements;

$R^1$, $R^2$, $R^3$, $R^4$, $R^5$, $R^6$ and $R^7$, equal to or different from each other, are selected from the group consisting of hydrogen and $C_1$-$C_{40}$ hydrocarbon radicals optionally comprising heteroatoms from Groups 13-17 of the Periodic Table of Elements; or two or more groups between $R^1$, $R^2$, $R^3$, $R^4$, $R^5$ and $R^6$ can be fused to form a saturated or unsaturated, 5- or 6-membered rings and optionally comprise $C_1$-$C_{20}$ alkyl radical substituents;

ii) at least one iron complex of the general formula (II):

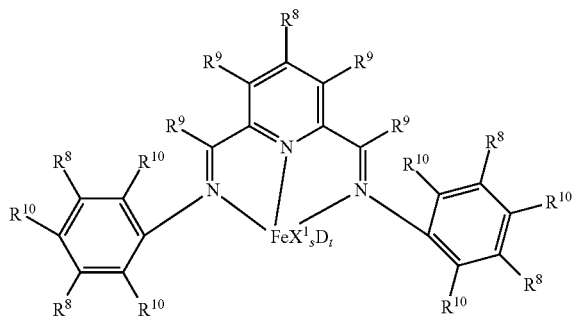

wherein the radical $X^1$ is selected from the group consisting of hydrogen, a halide, —R, —OR, —SO$_3$CF$_3$, —CO$_2$, —SR, —NR$_2$ and —PR2 groups, wherein R is selected from a linear, branched, saturated and/or unsaturated $C_1$-$C_{20}$ alkyl, $C_3$-$C_{20}$ cycloalkyl, $C_6$-$C_{20}$ aryl, $C_7$-$C_{20}$ alkylaryl and C7-C20 arylalkyl radical, optionally containing heteroatoms from Groups 13-17 of the Periodic Table of Elements; or $X^1$ can optionally form a substituted or unsubstituted butadienyl radical or an OR'O group, wherein R' is a divalent radical selected from $C_1$-$C_{20}$ alkylidene, $C_6$-$C_{40}$ arylidene, $C_7$-$C_{40}$ alkylarylidene and $C_7$-$C_{40}$ arylalkylidene radicals;

D is an uncharged donor; s is 1, 2, 3 or 4, t ranges from 0 to 4;

$R^8$, equal to or different from each other, are selected from the group consisting of hydrogen and $C_1$-$C_{40}$ hydrocarbon radicals optionally containing heteroatoms belonging to Groups 13-17 of the Periodic Table of Elements;

$R^{10}$, equal to or different from each other, are selected from the group consisting of hydrogen and $C_1$-$C_{40}$ hydrocarbon radicals optionally containing heteroatoms belonging to Groups 13-17 of the Periodic Table of Elements;

R9, equal to or different from each other, are selected from the group consisting of hydrogen and $C_1$-$C_{40}$ hydrocarbon radicals optionally containing heteroatoms belonging to Groups 13-17 of the Periodic Table of Elements; and iii) an alumoxane or a compound capable of forming an alkyl cation with complexes of formula (I) and (II).

2. The polymerization process of claim 1, wherein the compound of formula (I) has the general formula (Ia):

(Ia)

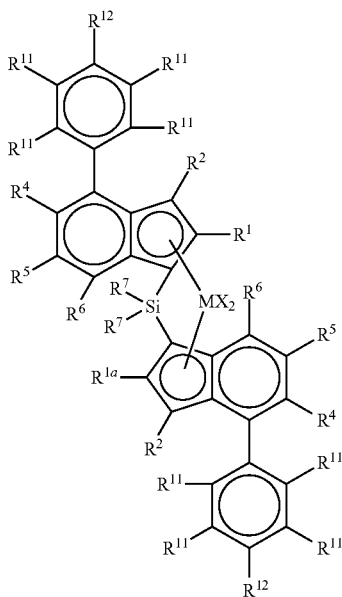

wherein M, X, $R^1$, $R^2$, $R^4$, $R^5$, $R^6$ and $R^7$ are defined in claim 1 and $R^{1a}$ has the general formula (III):

(III)

$$R^{14} \underset{R^{13}}{\overset{R^{13}}{\vphantom{|}}}{-}*$$

wherein the symbol * marks the bound with the cyclopentadienyl moiety; R13, equal to or different from each other, is a $C_1$-$C_{15}$ hydrocarbon radical optionally containing heteroatoms belonging to Groups 13-17 of the Periodic Table of Elements;

$R^{14}$ is selected from the group consisting of hydrogen and a $C_1$-$C_{15}$ hydrocarbon radical optionally containing heteroatoms belonging to Groups 13-17 of the Periodic Table of Elements; and $R^{11}$ and R12, equal to or different from each other, are selected from the group consisting of hydrogen and $C_1$-$C_{10}$ hydrocarbon radicals optionally containing heteroatoms belonging to Groups 13-17 of the Periodic Table of Elements.

3. The polymerization process of claim 1, wherein the compound of formula (I) has the general formula (Ib):

(Ib)

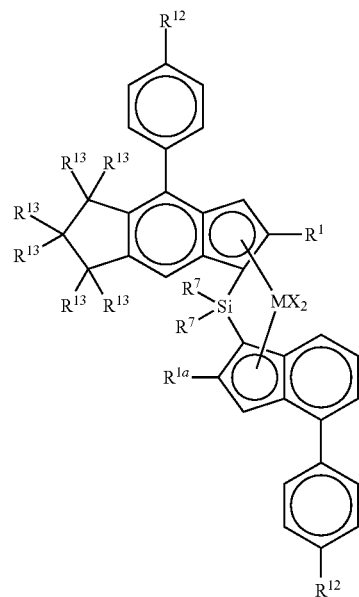

wherein M, X, $R^1$, $R^{1a}$, $R^7$ and $R^{12}$ are defined in claims 1 and 2, and $R^{13}$, equal to or different from each other, is selected from the group consisting of hydrogen and a $C_1$-$C_{10}$ hydrocarbon radical.

4. The polymerization process of claim 1, wherein the catalyst system is supported on an inert carrier.

5. The polymerization process of claim 1, wherein the molar ratio of the metallocene compound of formula (I) and the iron complex of formula (II) ranges from 3:1 to 50:1.

6. The polymerization process of claim 1, wherein the polyolefin composition comprises:
a) 30-50 wt % of a propylene homopolymer;
b) 40-65 wt % of an ethylene/propylene copolymer, wherein the ethylene content ranges from 20-65 wt %; and
c) 3-7 wt % of a polyethylene homopolymer;
wherein the sum of a)+b)+c) is 100 wt %.

7. The polymerization process of claim 6, wherein the polyolefin composition comprises a polyolefin blend.

8. The polymerization process of claim 6, wherein the polyolefin composition comprises an extruded article.

9. The polymerization process of claim 8, wherein the extruded article is selected from the group consisting of a film, a pipe, a fiber and a sheet.

10. The polymerization process of claim 6, wherein the polyolefin composition comprises a molded article.

11. The polymerization process of claim 6, wherein the polyolefin composition comprises a thermoformed article.

12. The polymerization process of claim 10, wherein the molded article is selected from the group consisting of an automotive part, a bumper, a battery case and a container.

* * * * *

UNITED STATES PATENT AND TRADEMARK OFFICE
CERTIFICATE OF CORRECTION

PATENT NO. : 9,738,778 B2
APPLICATION NO. : 14/407204
DATED : August 22, 2017
INVENTOR(S) : Fabiana Fantinel et al.

It is certified that error appears in the above-identified patent and that said Letters Patent is hereby corrected as shown below:

On the Title Page

Item (57)  Line 18  In the Abstract, delete "C3-C20" and insert --$C_3$-$C_{20}$--

In the Specification

| | | |
|---|---|---|
| Column 2 | Line 50 | Delete "C1-C10-alkyl" and insert --$C_1$-$C_{10}$-alkyl-- |
| Column 5 | Line 35 | Delete "$R_{13}$" and insert --$R^{13}$-- |
| Column 5 | Line 36 | Delete "$R_{13}$" and insert --$R^{13}$-- |
| Column 6 | Line 10 | Delete "n2" and insert --$n^2$-- |
| Column 7 | Line 1 | Delete "BAr4(-)," and insert --$BAr_4$(-),-- |
| Column 7 | Line 6 | Delete "BAr3" and insert --$BAr_3$-- |
| Column 7 | Line 10 | Delete "BAr3P" and insert --$BAr_3P$-- |
| Column 7 | Line 11 | Delete "pyrrol" and insert --pyrrole-- |
| Column 7 | Line 29 | Delete "N,N Dimethylaniliniumtetrakis(pentafluorophenyl)borate, N,N Dimethylaniliniumtetrakis(pentafluorophenyl)aluminate," and insert --N,N-Dimethylaniliniumtetrakis(pentafluorophenyl)borate, N,N-Dimethylaniliniumtetrakis(pentafluorophenyl)aluminate,-- |
| Column 7 | Line 42 | Delete "Ferroceniumtetrakis(pentafluorophenyl)aluminate." and insert --Ferroceniumtetrakis(pentafluorophenyl)aluminate,-- |
| Column 8 | Line 15 | Delete "ZrO2, TiO2 or B2O3." and insert --$ZrO_2$, $TiO_2$ or $B_2O_3$.-- |
| Column 8 | Line 26 | Delete "m2/g," and insert --$m^2$/g,-- |
| Column 8 | Line 28 | Delete "500 m." and insert --500 μm.-- |
| Column 8 | Line 30 | Delete "m2/g," and insert --$m^2$/g,-- |
| Column 8 | Line 31 | Delete "350 m." and insert --350 μm.-- |
| Column 8 | Line 33 | Delete "m2/g," and insert --$m^2$/g,-- |
| Column 8 | Line 44 | Delete "1 000° C." and insert --1000° C.-- |
| Column 8 | Line 49 | Delete "SiCl4," and insert --$SiCl_4$,-- |

Signed and Sealed this
Twenty-eighth Day of January, 2020

Andrei Iancu
*Director of the United States Patent and Trademark Office*

CERTIFICATE OF CORRECTION (continued)
U.S. Pat. No. 9,738,778 B2

| | | |
|---|---|---|
| Column 8 | Line 55 | Delete "(NH4)2SiF6" and insert --$(NH_4)_2SiF_6$-- |
| Column 10 | Line 41 | Delete "Mn, Mw," and insert --$M_n$, $M_w$,-- |
| Column 10 | Line 41 | Delete "Mw/Mn" and insert --$M_w/M_n$-- |
| Column 10 | Line 48 | Delete "500 ml" and insert --500 µl-- |
| Column 12 | Line 11 | Delete "10 l" and insert --101-- |
| Column 12 | Line 40 | In Table 2, delete "C2" and insert --$C_2$-- |
| Column 12 | Line 41 | In Table 2, delete "C3" and insert --$C_3$-- |
| Column 12 | Line 47 | In Table 2, delete "C2" and insert --$C_2$-- |
| Column 12 | Line 47 | In Table 2, delete "C3" and insert --$C_3$-- |
| Column 12 | Line 47 | In Table 2, delete "H2" and insert --$H_2$-- |
| Column 12 | Line 60 | In Table 3, delete "C2" and insert --$C_2$-- |
| Column 12 | Line 62 | In Table 3, delete "Mw/Mn" and insert --$M_w/M_n$-- |
| Column 12 | Line 63 | In Table 3, delete "Mw" and insert --$M_w$-- |

In the Claims

| | | |
|---|---|---|
| Column 13 | Line 56 | In Claim 1, delete "$C_6$-$C_{40}$ alkylaryl and" and insert --$C_6$-$C_{40}$ aryl,-- |
| Column 14 | Line 23 | In Claim 1, delete "-CO2," and insert --$CO_2R$,-- |
| Column 14 | Line 23 | In Claim 1, delete "-PR2" and insert -- -$PR_2$-- |
| Column 14 | Line 26 | In Claim 1, delete "C7-C20" and insert --$C_7$-$C_{20}$-- |
| Column 14 | Line 56 | In Claim 1, delete "R9," and insert --$R^9$,-- |
| Column 15 | Line 39 | In Claim 2, delete "R13,equal" and insert --$R^{13}$, equal-- |
| Column 15 | Line 50 | Delete "R12," and insert --$R^{12}$,-- |